(12) United States Patent
Ramanujam et al.

(10) Patent No.: US 10,356,734 B2
(45) Date of Patent: Jul. 16, 2019

(54) SYNCHRONIZATION SIGNAL OPTIONS FOR 5G/NEW RADIO

(71) Applicant: QUALCOMM INCORPORATED, San Diego, CA (US)

(72) Inventors: Sridhar Ramanujam, San Diego, CA (US); Xiaoxia Zhang, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/824,753

(22) Filed: Nov. 28, 2017

(65) Prior Publication Data

US 2018/0152905 A1 May 31, 2018

Related U.S. Application Data

(60) Provisional application No. 62/428,185, filed on Nov. 30, 2016.

(51) Int. Cl.
*H04L 12/28* (2006.01)
*H04W 56/00* (2009.01)
(Continued)

(52) U.S. Cl.
CPC ..... *H04W 56/0005* (2013.01); *H04L 27/2602* (2013.01); *H04L 27/2613* (2013.01)

(58) Field of Classification Search
CPC ........... H04W 56/0005; H04L 27/2602; H04L 27/2613
USPC ................................ 370/252, 329, 386, 430
See application file for complete search history.

(56) References Cited

U.S. PATENT DOCUMENTS

2013/0250818 A1* 9/2013 Gaal .................... H04W 56/00
370/277
2014/0334478 A1* 11/2014 Cheng .................. H04L 27/261
370/350
(Continued)

FOREIGN PATENT DOCUMENTS

WO WO-2009084931 A1 7/2009
WO WO-2017171398 A1 10/2017
(Continued)

OTHER PUBLICATIONS

Schaich F., et al., "Subcarrier Spacing—How to Make Use of This Degree of Freedom", IEEE 83rd Vehicular Technology Conference (VTC Spring), 2016, 7 Pages.
(Continued)

*Primary Examiner* — John Pezzlo
(74) *Attorney, Agent, or Firm* — Arent Fox LLP

(57) ABSTRACT

The present disclosure provides an example method and an apparatus for transmitting synchronization signals from an eNB with a different subcarrier spacing from rest of transmissions. That is, a primary synchronization signal (PSS), a secondary synchronization signal (SSS) may be transmitted using a first subcarrier spacing, a physical broadcast channel (PBCH), and/or a reference signal (RS) may be transmitted with a second subcarrier spacing, and other transmissions may be made using a third subcarrier spacing that is different from at least one of the first or second subcarrier spacing. Further, the order of symbols mapped to the synchronization signals may be reversed or otherwise modified within a transmission subframe.

38 Claims, 13 Drawing Sheets

(51) Int. Cl.
*H04L 27/26* (2006.01)
*H04J 1/16* (2006.01)

(56) References Cited

U.S. PATENT DOCUMENTS

| | | | | |
|---|---|---|---|---|
| 2017/0094547 | A1* | 3/2017 | Yum | H04W 72/04 |
| 2017/0111930 | A1 | 4/2017 | Rajagopal et al. | |
| 2017/0156140 | A1 | 6/2017 | Islam et al. | |
| 2018/0084593 | A1* | 3/2018 | Chen | H04W 76/11 |
| 2018/0092002 | A1* | 3/2018 | Manolakos | H04L 5/0007 |
| 2018/0098361 | A1* | 4/2018 | Ji | H04W 74/0866 |
| 2018/0123849 | A1* | 5/2018 | Si | H04J 11/0073 |
| 2018/0124726 | A1* | 5/2018 | Zhang | H04W 56/0005 |
| 2018/0131493 | A1* | 5/2018 | Luo | H04L 5/0053 |
| 2018/0131494 | A1* | 5/2018 | Li | H04W 24/10 |
| 2018/0139713 | A1* | 5/2018 | Lee | H04W 56/0005 |

FOREIGN PATENT DOCUMENTS

| | | |
|---|---|---|
| WO | WO-2017173133 A1 | 10/2017 |
| WO | WO-2017184341 A1 | 10/2017 |

OTHER PUBLICATIONS

Donarski A., et al., "Downlink LTE Synchronization: A Software Defined Radio Approach," 8th International Conference on Signal Processing and Communication Systems (ICSPCS), IEEE, Dec. 15, 2014, 10 pages, XP032729246 [retrieved on Jan. 23, 2015].
Intel Corporation: "NR PBCH Structure," 3GPP Draft, R1-1702181, 3GPP TSG RAN WG1, Meeting #88, Athens, Greece, Feb. 13-17, 2017, 7 pages, XP051222039 Retrieved from the Internet: URL: http://www.3gpp.org/ftp/tsg_ran/WG1_RL1/TSGR1_88/Docs/ [retrieved on Feb. 15, 2017].
International Search Report and Written Opinion—PCT/US2017/063698—ISA/EPO—dated Feb. 15, 2018.
LG Electronics: "Discussion on Initial Access Procedure," 3GPP Draft, R1-1611792, 3GPP TSG RAN WG1, Meeting #87, Reno, USA, Nov. 14-18, 2016, XP051190717 Retrieved from the Internet: URL:http://www.3gpp.org/ftp/tsg_ran/WG1_RL 1 /TSGR1_87/ Docs/ [retrieved on Nov. 6, 2016].
NTT Docomo, Inc., "Discussion on Broadcast Signal/Channel for NR," 3GPP Draft, R1-1700611, 3GPP TSG RAN WG1, AH_NR Meeting, Spokane, USA, Jan. 16-20, 2017, 5 pages, XP051202994 Retrieved from the Internet: URL: http://www.3gpp.org/ftp/tsg_ran/ WG1_RL 1/TSGR1_AH/NR_AH_1701/Docs/ [retrieved on Jan. 10, 2017].
Samsung: "Numerology for NR Synchronization Signal," 3GPP Draft, R1-1612454, 3GPP TSG RAN WG1, Meeting #87, Reno, USA, Nov. 14-18, 2018, 3 pp. XP051189339, Retrieved from the Internet: URL: http://www.3gpp.org/ftp/tsg_ran/WG1_RL1/TSGR1_ 87/Docs/ [retrieved on Nov. 4, 2016].

* cited by examiner

SYNCHRONIZATION SIGNAL OPTIONS FOR 5G/NEW RADIO

CLAIM OF PRIORITY 35 U.S.C. § 119

The present Application for Patent claims priority to Provisional Application No. 62/428,185 entitled "SYNCHRONIZATION SIGNAL OPTIONS FOR 5G/NEW RADIO" filed Nov. 30, 2016, which is assigned to the assignee hereof, and incorporated herein by reference in its entirety.

BACKGROUND

The present disclosure relates generally to signaling in wireless networks, and more particularly, to transmission of synchronization signals in wireless networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

In long term evolution (LTE) networks, a subcarrier spacing of 15 KHz is used. The subcarrier spacing of 15 KHz applies to synchronization signals (e.g., primary synchronization signal (PSS) and secondary synchronization signal (SSS)), physical broadcast channel (PBCH), reference signal (RS), and transmission of other signals including control and data signals. The use of one subcarrier spacing for all types of signals may affect performance in wireless networks.

Therefore, there is a desire for a method and an apparatus for flexibility to use different subcarrier spacings in 5G/NR networks

BRIEF DESCRIPTION OF THE DRAWINGS

As disclosed aspects will hereinafter be described in conjunction with the appended drawings, provided to illustrate and not to limit the disclosed aspects, wherein like designations denote like elements, and in which.

SUMMARY

Figure 1A:
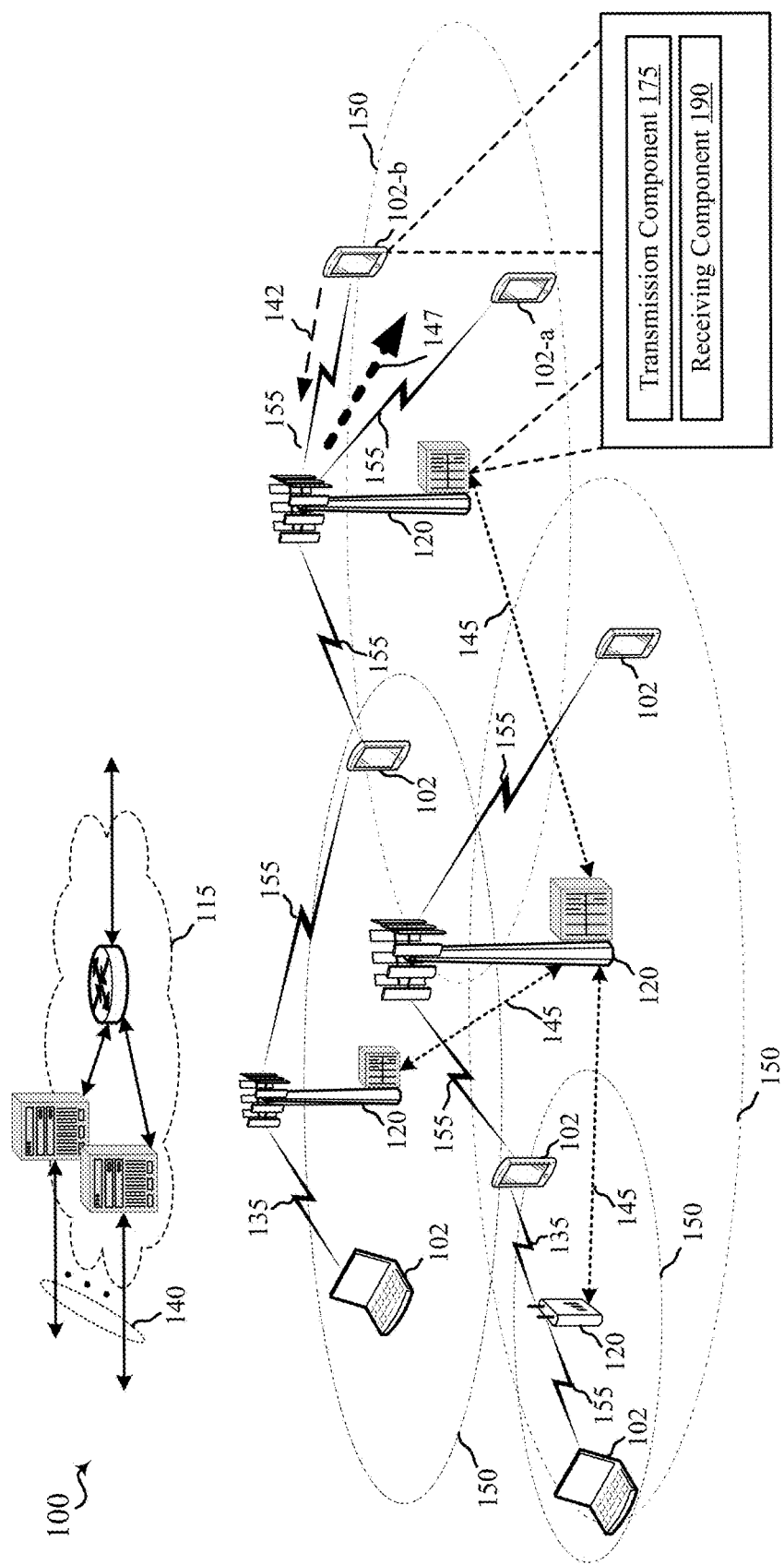
FIG. 1A is a schematic diagram of an example of a wireless communication network.

The present disclosure provides 5G/NR subframe structures for transmitting synchronization signals from an a base station (e.g., an ENB) to one or more UEs The 5G/NR protocol supports a wide range of subcarrier spacings, the entirety of which may be utilized in the various aspects of the present disclosure. Subcarrier spacings of 15 KHz, 30 KHz, and 60 KHz may be particularly well suited to implementing the proposed subframe structures. Multiple synchronization signals may be compressed into a single subframe or alternatively allotted individual subframes. Each signal may be mapped to one or more symbols within a subframe, the number of symbols available in each subframe depending upon the subcarrier spacing assigned to the subframe.

In an aspect, the disclosure provides a method of wireless communications for an base station. The method may include transmitting, from an base station, synchronization signals with a first subcarrier spacing, wherein the synchronization signals include a primary synchronization signal (PSS) and a secondary synchronization signal (SSS). The method may include transmitting, from the base station, a physical broadcast channel (PBCH) and a reference signal (RS) with a second subcarrier spacing. Further, the method may include transmitting, from the base station, other transmissions with a third subcarrier spacing. The first subcarrier spacing, the second subcarrier spacing, and the third subcarrier spacing are defined at the base station with at least one of the first subcarrier spacing and the second subcarrier spacing being less than the third subcarrier spacing.

In another aspect, the disclosure provides a base station for wireless communications. The base station may include a transceiver, a memory, and a processor communicatively coupled with the transceiver and the memory. The processor and the memory may be configured to transmit synchronization signals with a first subcarrier spacing, wherein the synchronization signals include a PSS and a SSS. The processor is further configured to transmit a PBCH and a RS with a second subcarrier spacing. Further, the processor is further configured to transmit other transmissions with a third subcarrier spacing. The first subcarrier spacing, the second subcarrier spacing, and the third subcarrier spacing are defined at the base station with at least one of the first subcarrier spacing and the second subcarrier spacing is less than the third subcarrier spacing.

In another aspect, the disclosure provides another base station for wireless communications. The base station may include means for transmitting, synchronization signals with a first subcarrier spacing, wherein the synchronization signals include a PSS and a SSS. The base station may include means for transmitting a PBCH and a RS with a second subcarrier spacing. Further, the base station may include means for transmitting other transmissions with a third subcarrier spacing. The first subcarrier spacing, the second subcarrier spacing, and the third subcarrier spacing are defined at the base station with at least one of the first subcarrier spacing and the second subcarrier spacing is less than the third subcarrier spacing.

In another aspect, the disclosure provides a computer readable medium storing computer executable code for wireless communications by a base station. The computer readable medium may include code for transmitting synchronization signals with a first subcarrier spacing, wherein the synchronization signals include a PSS and a SSS. The computer readable medium may include code for transmitting a PBCH and a RS with a second subcarrier spacing. Further, the computer readable medium may include transmitting other transmissions with a third subcarrier spacing. The first subcarrier spacing, the second subcarrier spacing, and the third subcarrier spacing are defined at the base station with at least one of the first subcarrier spacing and the second subcarrier spacing is less than the third subcarrier spacing.

Further, the present disclosure provides 5G/NR subframe structures for receiving synchronization signals at a user equipment (e.g., an UE) from a base station (e.g., an eNB). The 5G/NR protocol supports a wide range of subcarrier spacings, the entirety of which may be utilized in the various aspects of the present disclosure. Subcarrier spacings of 15 KHz, 30 KHz, and 60 KHz may be particularly well suited to implementing the proposed subframe structures. Multiple synchronization signals may be compressed into a single subframe or alternatively allotted individual subframes. Each signal may be mapped to one or more symbols within a subframe, the number of symbols available in each subframe depending upon the subcarrier spacing assigned to the subframe.

In an aspect, the disclosure provides a method of wireless communications for a UE. The method may include receiving, at a UE, synchronization signals with a first subcarrier spacing, wherein the synchronization signals include a primary synchronization signal (PSS) and a secondary synchronization signal (SSS). The method may include receiving, at the UE, a physical broadcast channel (PBCH) and a reference signal (RS) with a second subcarrier spacing. Further, the method may include receiving, at the UE, other transmissions with a third subcarrier spacing. The first subcarrier spacing, the second subcarrier spacing, and the third subcarrier spacing are defined at the base station with at least one of the first subcarrier spacing and the second subcarrier spacing being less than the third subcarrier spacing.

In another aspect, the disclosure provides a UE for wireless communications. The UE may include a transceiver, a memory, and a processor communicatively coupled with the transceiver and the memory. The processor and the memory may be configured to receive synchronization signals with a first subcarrier spacing, wherein the synchronization signals include a PSS and a SSS. The processor is further configured to receive a PBCH and a RS with a second subcarrier spacing. Further, the processor is further configured to receive other transmissions with a third subcarrier spacing. The first subcarrier spacing, the second subcarrier spacing, and the third subcarrier spacing are defined at the base station with at least one of the first subcarrier spacing and the second subcarrier spacing is less than the third subcarrier spacing.

In another aspect, the disclosure provides another UE for wireless communications. The UE may include means for receiving, synchronization signals with a first subcarrier spacing, wherein the synchronization signals include a PSS and a SSS. The UE may include means for receiving a PBCH and a RS with a second subcarrier spacing. Further, the UE may include means for receiving other transmissions with a third subcarrier spacing. The first subcarrier spacing, the second subcarrier spacing, and the third subcarrier spacing are defined at the base station with at least one of the first subcarrier spacing and the second subcarrier spacing is less than the third subcarrier spacing.

In another aspect, the disclosure provides a computer readable medium storing computer executable code for wireless communications at a UE. The computer readable medium may include code for receiving synchronization signals with a first subcarrier spacing, wherein the synchronization signals include a PSS and a SSS. The computer readable medium may include code for receiving a PBCH and a RS with a second subcarrier spacing. Further, the computer readable medium may include receiving other transmissions with a third subcarrier spacing. The first subcarrier spacing, the second subcarrier spacing, and the third subcarrier spacing are defined at the base station with at least one of the first subcarrier spacing and the second subcarrier spacing is less than the third subcarrier spacing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In long term evolution (LTE) networks, a subcarrier spacing of 15 KHz is used. The subcarrier spacing of 15 KHz applies to synchronizations signals (e.g. PSS and SSS), PBCH, RS, and transmission of other signals including control and data signals. The use of one subcarrier spacing for all types of signals may affect performance in wireless networks. In 5G (NR) communications, transmission efficiency may be improved by spreading synchronization signals over multiple subcarrier spacing and/or manipulating transmission time intervals (TTI) for types of synchronization signals.

The present disclosure provides an example method and an apparatus for transmitting synchronization signals from a base station with a different subcarrier spacing from rest of transmissions. That is, a PSS and a SSS may be transmitted using a first subcarrier spacing, a PBCH, and/or a RS may be transmitted with a second subcarrier spacing, and other transmissions may be transmitted with a third subcarrier spacing that is different from at least one of the first or second subcarrier spacing. In an aspect, the PSS/SSS and PBCH/RS may be transmitted in different TTIs to provide flexibility to define different subcarrier spacing and/or to improve decoding reliability and cell ID detection at a user equipment (UE). In an aspect, the PSS/SSS may use one different subcarrier spacing and PBCH/RS may use another subcarrier spacing. In an aspect, the PSS may use a different subcarrier spacing from SSS.

The present disclosure further provides for methods of synchronization signal scheduling including reversing or manipulating the order of PSS and SSS symbols within a transmission subframe. For example the PSS and SSS may be mapped to symbols in an order reversed from a standard configuration in which the SSS symbols are mapped earlier in a subframe than the PSS symbols, the PBCH and RS may be transmitted according to a standard configuration, and any additional transmissions may be transmitted as needed.

In an aspect, the present disclosure provides for synchronization signal scheduling that uses varied subcarrier spacings and/or TTIs. Various aspects may further provide for the mapping of synchronization signals to multiple symbols and/or as symbols of varied transmission order. Some signals such as PSS and SSS may be longer in order to fill available subcarrier spacing. In some aspects, the PSS and SSS be repeated within a subframe. The PBCH may include multiple symbols having identical modulation symbols, RS sequences and RS tone mapping. These synchronization signal scheduling modifications may improve transmission efficiency and power consumption.

Various aspects are now described in more detail with reference to the FIGS. 1A-8. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1A, in accordance with various aspects of the present disclosure, an example wireless communication network 100 includes at least one base station having a transmission component 175 and UE 102 having a receiving component 190 configured to perform one or more techniques described herein. A base station 120 may also include a transmission function 126 (shown in FIG. 1B) implementing stored codes or techniques for transmitting synchronization signals via the transmission component 175. The UE 102 may also include a receiving function 114 implementing stored codes or techniques for receiving synchronization signals from the base station 120 via the receiving component 190. In various aspects, the transmission component 175 and the receiving component 190 may be present in both eNB 120 and UE 102, or separately such that the transmission component 175 is present in eNB 175 while receiving component 190 is present in UE 102. Further, in some aspects, the transmission component 175 and receiving component 190 may vary in structure or implementation functions and hardware between the eNB 120 and the UE 102.

In various aspects, the base station 120 may transmit one or more synchronization signals 147 to UE 102 using the transmission component 175. In an aspect, the transmission component 175 may enable a base station 120 to transmit synchronization signals having varied subcarrier spacings and/or symbol mapping positions according to the transmission properties such as subcarrier spacing, transmission time interval, number and order of synchronization symbols, and size of synchronization signals. The transmissions may be received by a UE 102 using the receiving component 190 that may receive and demodulate synchronization signals.

The wireless communication network 100 may include one or more base stations 120, one or more UEs 102, and a core network 115. The core network 115 may provide user authentication, access authorization, tracking, internet protocol (IP) connectivity, and other access, routing, or mobility functions. The base stations 120 may interface with the core network 115 through backhaul links 140 (e.g., S1, etc.). The base stations 120 may perform radio configuration and scheduling for communication with the UEs 102, or may operate under the control of a base station controller (not shown). In various examples, the base stations 120 may communicate, either directly or indirectly (e.g., through core network 115), with one another over backhaul links 145 (e.g., X1, etc.), which may be wired or wireless communication links.

The base stations 120 may wirelessly communicate with the UEs 102 via one or more base station antennas. Each of the base stations 120 may provide communication coverage for a respective geographic coverage area 150. In some examples, base stations 120 may be referred to as a base transceiver station, a radio base station, an access point, a radio transceiver, a NodeB, eNodeB (eNB), a gNodeB (gNB), transmit-receive point (TRP), Home NodeB, a Home eNodeB, a relay, or some other suitable terminology. The geographic coverage area 150 for a base station 120 may be divided into sectors or cells making up only a portion of the coverage area (not shown). The wireless communication network 100 may include base stations 120 of different types (e.g., macro base stations or small cell base stations, described below). Additionally, the plurality of base stations 120 may operate according to different ones of a plurality of communication technologies (e.g., 5G, 4G/LTE, 3G, Wi-Fi, Bluetooth, etc.), and thus there may be overlapping geographic coverage areas 150 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. Moreover, the wireless communication network 100 may support high frequency operations such as millimeter wave communications. In LTE/LTE-A networks, the term evolved node B (eNB) may be generally used to describe the base stations 120, while the term UE may be generally used to describe the UEs 102. The wireless communication network 100 may be a heterogeneous LTE/LTE-A network in which different types of eNBs provide coverage for various geographical regions. For example, each eNB or base station 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 102 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 102 with service subscriptions with the network provider. A femto cell may also cover a small geographic area (e.g., a home) and may provide restricted access and/or unrestricted access by the UEs 102 having an association with the femto cell (e.g., in the restricted access case, the UEs 102 in a closed subscriber group (CSG) of the base station 120, which may include the UEs 102 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 102 and the base stations 120. The RRC protocol layer may also be used for core network 115 support of radio bearers for the user plane data. At the physical (PHY) layer, the transport channels may be mapped to physical channels.

The UEs 102 may be dispersed throughout the wireless communication network 100, and each UE 102 may be stationary or mobile. A UE 102 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 102 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 102 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 102 may be able to communicate with various types of base stations 120 and network equipment including macro eNBs, small cell eNBs, relay base stations, and the like.

A UE 102 may be configured to establish one or more wireless communication links 155 with one or more base stations 120. The wireless communication links 155 shown in wireless communication network 100 may carry UL transmissions from a UE 102 to a base station 120, or downlink (DL) transmissions, from a base station 120 to a UE 102. The downlink transmissions may also be called forward link transmissions while the uplink transmissions may also be called reverse link transmissions. Each wireless communication link 155 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the communication links 155 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 155 may represent one or more broadcast channels.

In some aspects of the wireless communication network 100, the base stations 120 or UEs 102 may include multiple antennas for employing antenna diversity schemes to improve communication quality and reliability between the base stations 120 and the UEs 102. Additionally or alternatively, the base stations 120 or UEs 102 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 102 may be configured with multiple downlink CCs and one or more uplink CCs for carrier aggregation. Carrier aggregation may be used with both FDD and TDD component carriers.

Figure 1B:
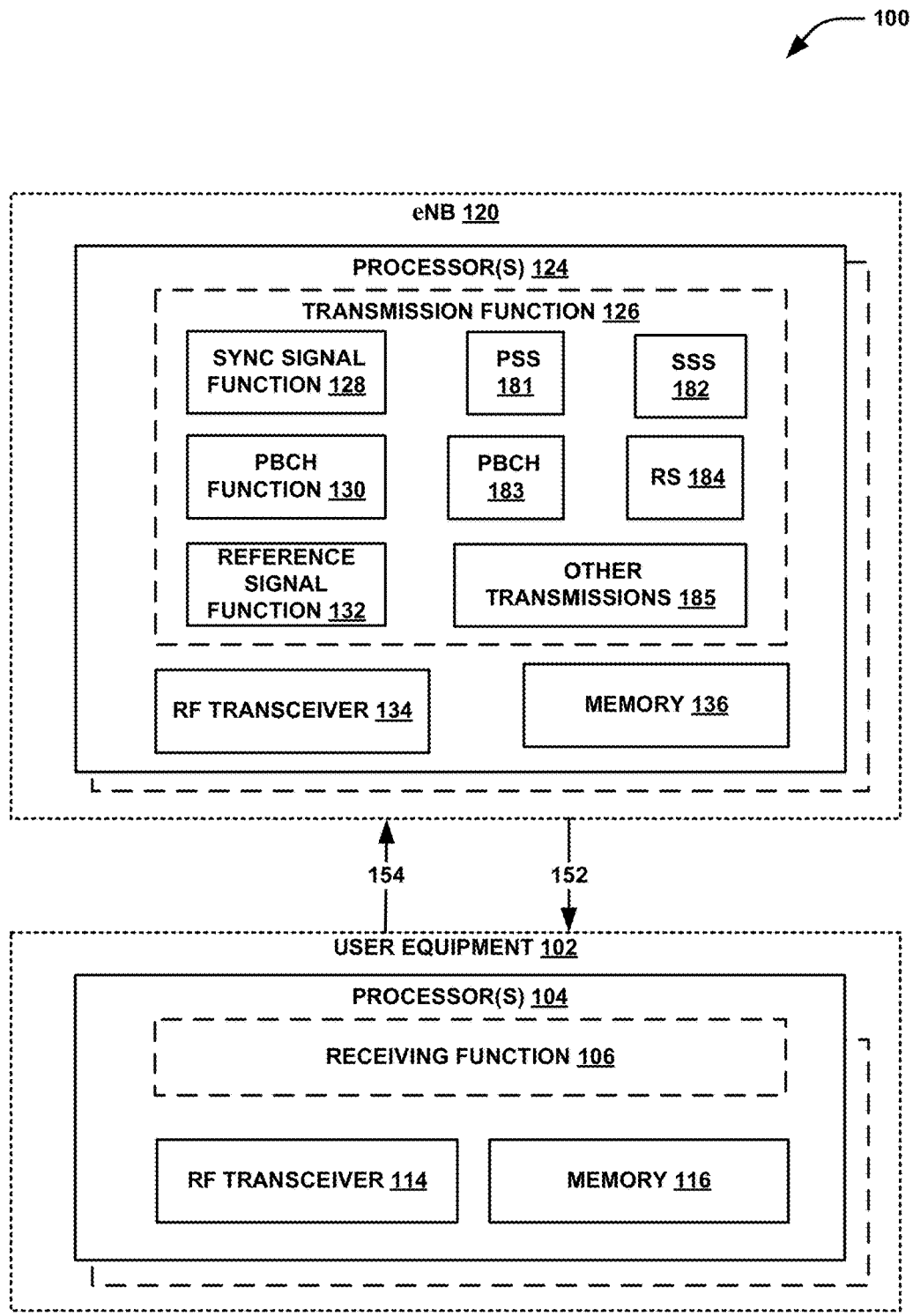
FIG. 1B is a schematic diagram of an example of a wireless communications system including a user equipment (UE) and eNB having aspects of a transmission function.

Referring to FIG. 1B, in an aspect, a wireless communication system 100 includes an eNB 120, one or more processors 124, and/or a transmission function 126, e.g. transmission component 175, running on a processor 124 (or processors 124 in a distributed computing environment) for transmitting synchronization signals, a PBCH 183, a RS 184, and/or other transmissions 185 from eNB 120. The synchronization signals 180 may include a PSS 181 and SSS 182 which may be transmitted with various subcarrier spacing, e.g., 60 KHz, 30 KHz, 15 KHz, etc., based on the design of wireless communication system 100 for improving performance of wireless communication system 100. In an aspect, the eNB 120 and/or transmission function 126 may further include a synchronization (sync) signal function 128, a PBCH function 130, and/or a RS function 132. Each of the sync signal function 128, PBCH function 130, and RS function 132 may control and generate the respective signals, while transmission function 126 may map the generated signals to subframe symbols and assign subcarrier spacing and transmission time intervals (TTIs). The eNB 120 may further include a RF transceiver 134 for transmitting the synchronization signals and/or a memory 136.

Wireless communication system 100 may include one or more user UEs 102, each UE 102 having one or more processors 104, and/or a receiving function 106, e.g., receiving component 190, running on processor 104 (or processors 104 in a distributed computing environment) for receiving signals or transmissions from eNB 120. The signals or transmissions received from the eNB 120 may include PSS 181, SSS 182, PBCH 183, RS 184, and/or other transmissions 185. In various aspects, the receiving function 106 may be a mirror of transmission function 126 of the eNB 120.

The eNB 120 may be in communication with the UE 102 via one or more over-the-air links, e.g., downlink (DL) 152 and/or uplink (UL) 154. In an aspect, DL 152 is generally used for communication from eNB 120 to UE 102 and UL 154 is generally used for communication from UE 102 to eNB 120.

The eNB 120 may be a base station (BS) or Node B or eNodeB, a macro cell, a small cell (e.g., a femtocell, or a pico cell), a relay, a peer-to-peer device, etc. In an example aspect, the nodes may operate according to wireless local area network (WLAN) specification as defined in IEEE 802.11 and/or may operate according to Wideband Code Division Multiple Access (W-CDMA), Code Division Multiple Access (CDMA), Time Division Synchronous Code Division Multiple Access (TD-SCDMA), Long Term Evolution (LTE), Global System for Mobile Communications (GSM), 5G (NR) standard as defined in 3GPP Specifications.

FIGS. 2-6 illustrate example aspects of transmitting synchronization signals, PBCH, RS, and/or other transmissions from the eNB 120 in aspects of the present disclosure.

Figure 2:
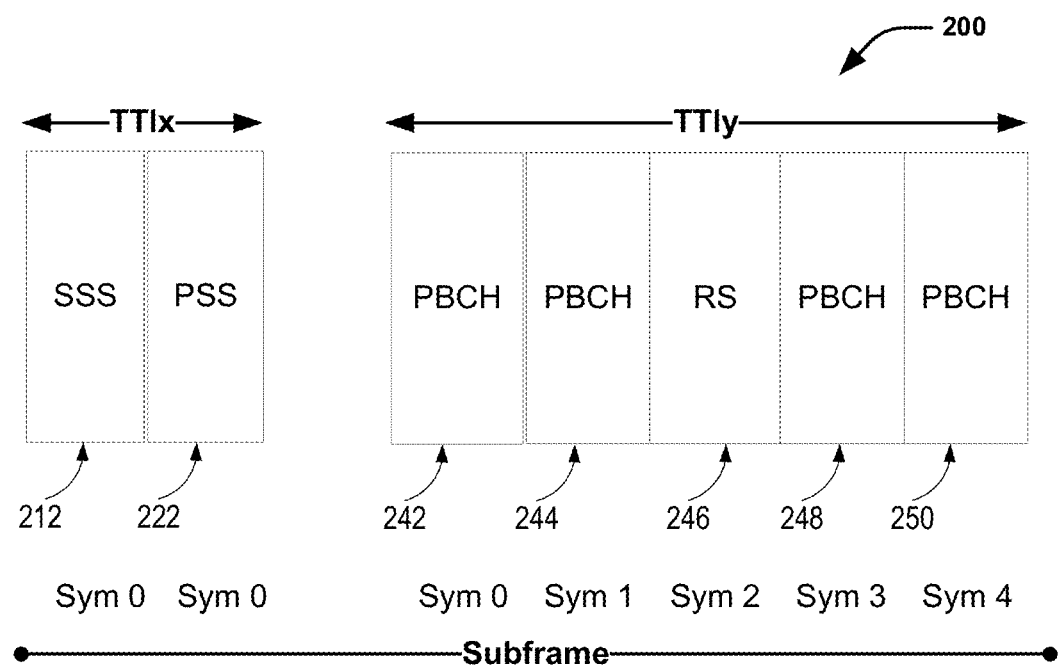
FIG. 2 illustrates an example of a subframe for transmitting synchronization signals with different subcarrier spacings in accordance with an embodiment.

FIG. 2 illustrates an aspect of eNB 120 for transmitting PSS 181, SSS 182, PBCH 183, and/or RS 184 with a different subcarrier spacing from rest of transmissions, e.g., other transmissions 185, and/or a synchronization (sync) bandwidth twice that of LTE. The illustrated subframe includes symbols associated with each of the PSS 181, SSS 182, PBCH 183, RS 186, e.g. SSS symbol (sym) 0, PSS symbol (sym) 0, and PBCH/RS symbol (sym) 0 through symbol (sym) 4 in an exemplary configuration. Each signal may be mapped to one or more symbols within the subframe. For example, in FIG. 2, the SSS is mapped to a SSS symbol (sym) 0 position and PSS is mapped to a symbol in the PSS symbol (sym) 0 position. In some aspects the position of the symbols to which synchronization signals are mapped may convey information to a receiving UE 102 about the synchronization preferences of the eNB 120.

A subcarrier spacing may be defined as a distance between adjacent subcarriers in a frequency domain. For example, the eNB 120 may transmit PSS 181, SSS 182, PBCH 183, and/or RS 184 with a subcarrier spacing of 30 KHz as illustrated by 212, 222, 242, 244, 246, 248, and 250. Although not shown, the rest of transmissions from eNB 120 may be transmitted with a subcarrier spacing of 60 KHz. The transmission of PSS 181, SSS 182, PBCH 183, and/or RS 184 with a subcarrier spacing of 30 KHz (that is smaller than the subcarrier spacing for the rest of transmissions) may help improve performance at the UE 102. The UE may have better success searching for the signals transmitted from the eNB 120 and decoding the signals as the signals transmitted with a 30 KHz subcarrier spacing have wider symbols (e.g., symbols are longer in duration in the time domain) when compared to signals transmitted from the eNB 120 with 60 KHz subcarrier spacing. Further, other transmissions from the eNB 120 may use a 60 KHz subcarrier spacing, or any other subcarrier spacing as defined by the Specifications (e.g., 45 KHz, 75 KHz, 90 KHz, etc.) for 5G/NR. The rest of transmissions may include control data and/or user data transmissions.

In an additional aspect, synchronization signals (e.g., PSS 181 and SSS 182) may be transmitted having a first TTI (e.g., a first TTI, e.g., TTIx) and PBCH 183 and RS 184 may be transmitted having a second TTI (e.g., a second TTI, e.g., TTIy). That is, PSS/SSS and PBCH/RS are transmitted in different TTIs. For example, PSS 181 and SSS 182 may be transmitted in subframe zero every ten subframes (e.g., periodicity of 10 ms), and PBCH 183 and RS 184 may be transmitted in subframe one every 20 subframes (e.g., periodicity of 20 ms). That is, PSS/SSS and PBCH/RS are transmitted in different subframes and/or with different periodicity. This provides flexibility in transmission of SSS 212, PSS 222, PBCH 240, and/or RS 250 for improving performance.

On the receiving side, the UE 102 searches for PSS 181 and decodes PSS 181 upon finding the PSS. The UE 102 then searches for SSS 182 on either side of PSS 181 (e.g., in frequency domain, as PSS and SSS are adjacent to each other in frequency domain) and decodes SSS 182 upon finding SSS 182. After the UE 102 finds PSS 181 and SSS 182, UE 102 identifies cell ID and timing of eNB 120 and decodes PBCH 183 using RS 184 as a reference. The use of smaller subcarrier spacing along with using different TTIs provides for a faster acquisition at the UE.

Figure 3:
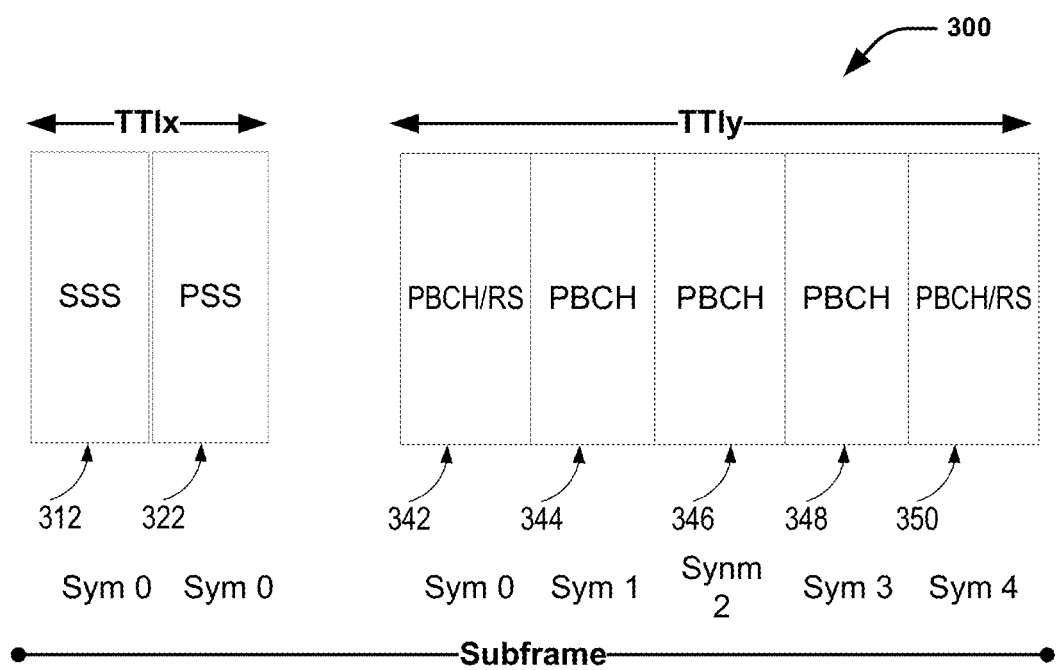
FIG. 3 illustrates an example of a subframe for transmitting synchronization signals with different subcarrier spacing for signals and PBCH/RS multiplexing in accordance with an embodiment.

FIG. 3 illustrates another aspect of eNB 120 transmitting PSS 181, SSS 182, PBCH 183, and/or RS 184 with a different subcarrier spacing from the rest of transmissions, e.g., other transmissions 185. In FIG. 3, RS 184 may be multiplexed (e.g., frequency division multiplexing) with PBCH 183. In one implementation, PBCH 183 symbol (sym) 342 (e.g., PBCH symbol (sym) 0) may be multiplexed with RS 184 and/or PBCH 183 symbol (sym) 350 (e.g., PBCH symbol (sym) 4) may be multiplexed with RS 184. This is just an example, and in an additional or optional implementation PBCH 183 symbol 344 (e.g., symbol (sym) 1) may be multiplexed with RS 184 and/or PBCH 183 symbol 348 (e.g., symbol (sym) 3) may be frequency division multiplexed with RS 184.

Figure 4:
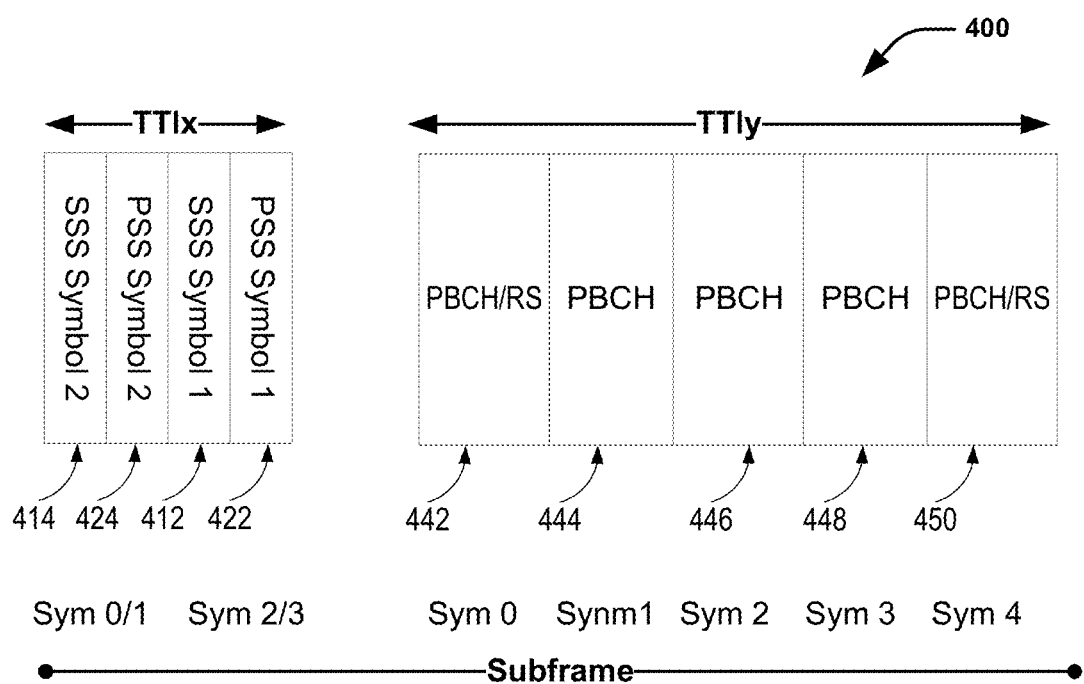
FIG. 4 illustrates an example of a subframe for transmitting synchronization signals having repeating synchronization signal symbols in accordance with an embodiment.

FIG. 4 illustrates another aspect of the eNB 120 transmitting PSS 181 and SSS 182, PBCH 183 and/or RS 184 with a same subcarrier spacing using multiple PSS and/or SSS symbols. For instance, a subcarrier spacing of 60 KHz is used for PSS/SS in FIG. 4. For example, in one implementation, multiple PSS and/or SSS symbols (e.g., PSS Symbol (sym) 1 422, PSS Symbol (sym) 2 424, SSS Symbol (sym) 1 412, and/or SSS Symbol (sym) 2 414) may be transmitted to enhance the performance of detecting the cell ID at UE 102. The transmitted symbols may be identical, e.g. repeating. In another implementation, longer PSS/SSS sequences may be used which may or may not be mapped to multiple PSS/SSS symbols. Additionally, PBCH 183 symbol (sym) 442 (e.g., symbol (sym) 0) may be multiplexed with RS 184 and/or PBCH 183 symbol (sym) 450 (e.g., symbol (sym) 4) may be multiplexed with RS 184. This is just an example, and additional implementations are supported as described above in reference to FIG. 3

Figure 5:
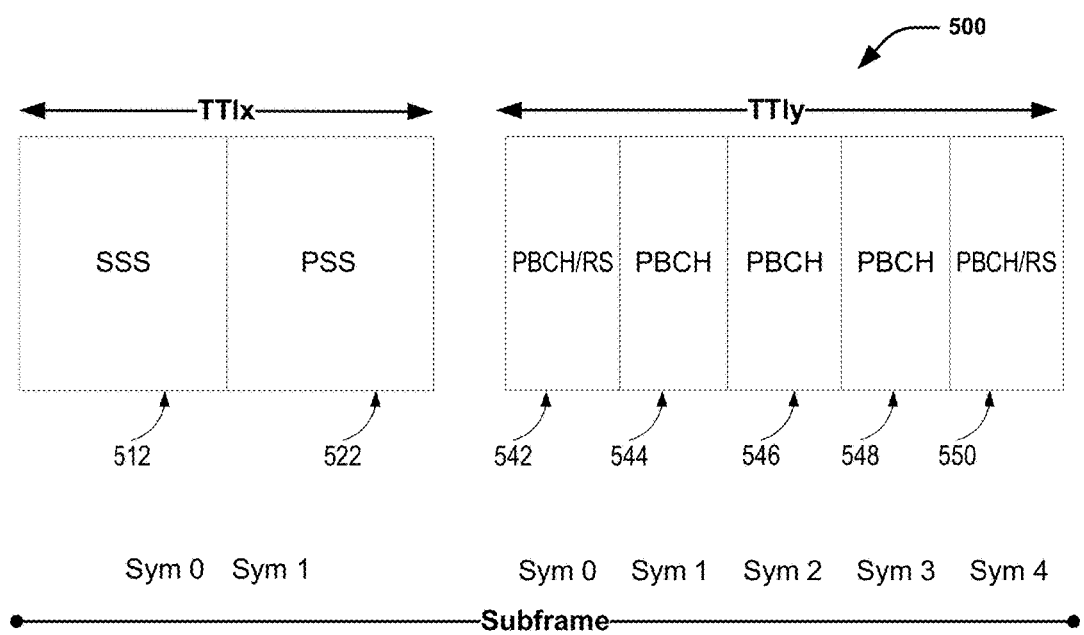
FIG. 5 illustrates an example of a subframe for transmitting synchronization signals having longer symbols in PSS and SSS in accordance with an embodiment.

FIG. 5 illustrates another aspect of the eNB 120 transmitting PSS 181 and SSS 182 with a subcarrier spacing of 15 KHz and PBCH 183 and RS 184 with a subcarrier spacing of 30 KHz, and rest of transmissions, e.g., other transmissions 185 using a subcarrier spacing of 60 KHz. As PSS 181/SSS 182 and PBCH 183/RS 184 are transmitted in two TTIs (that is, not transmitted in one TTI, split into two TTIs, etc.), longer time span of PSS and/or SSS symbols in 15 KHz subcarrier spacing may be used to enhance the performance of cell ID detection.

In an additional implementation, PSS 181 may use 15 KHz subcarrier spacing (still using the same bandwidth) while SSS 182 may use 30 KHz subcarrier spacing and is half the length of the PSS symbol. That is, the PSS 181 has a sequence that is twice as long as the sequence in SSS 182, which may allow for improved PSS detection. Additionally, PBCH 183 symbol 542 (e.g., symbol (sym) 0) may be multiplexed with RS 184 and/or PBCH 183 symbol 550 (e.g., symbol (sym) 4) may be multiplexed with RS 184 to create PBCH/RS symbols. This is just an example, and additional implementations are supported as described above in reference to FIG. 3.

Figure 6:
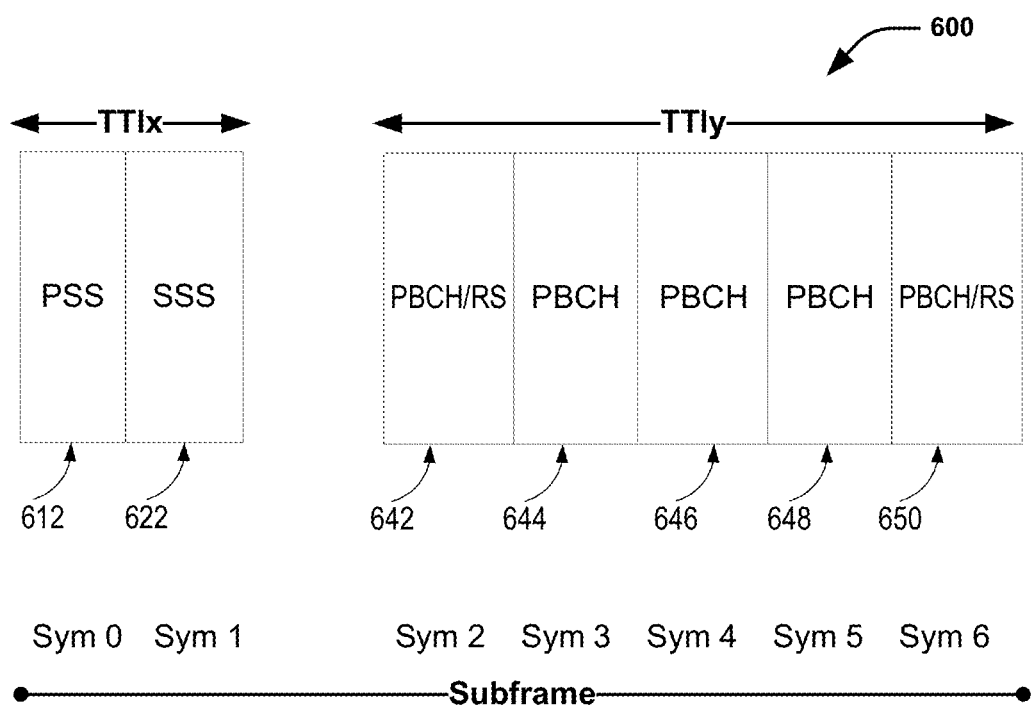
FIG. 6 illustrates an example of a subframe for transmitting synchronization signals with symbol positions of some synchronization signals reversed within the subframe in accordance with an embodiment.

FIG. 6 illustrates another aspect of the eNB 120 transmitting PSS 181 and SSS 182 with different relative positions.

For example, in one implementation, the transmission order of a symbol mapped to PSS 181 and a symbol mapped to SSS 182 may be reversed. That is, the symbol mapped to PSS 181 may be transmitted first, and then followed by the symbol mapped to SSS 182. This relative position may be used to convey additional information to UE 102 without the use of additional bits. For instance, the relative position of PSS/SSS may relay that a subcarrier spacing of 30 KHz is used for transmission of PBCH 183 and/or RS 184, cell identifiers of eNB 120 (e.g., position of a PSS symbol before an SSS symbol may signal cell IDs from 0 to 503 and SSS before PSS may signal cell IDs from 504 to 1007), transmission scheme to be used for PBCH (e.g. Small delay CDD vs Transmit Diversity), or relative location of the PBCH 183 TTI (e.g. PBCH is not transmitted in this subframe if the order is reversed) Additionally, PBCH 183 symbol 642 (e.g., symbol (sym) 0) may be multiplexed with RS 184 and/or PBCH 183 symbol 650 (e.g., symbol (sym) 4) may be multiplexed with RS 184. This is just an example, and additional implementations are supported as described above in reference to FIG. 3.

Figure 7A:
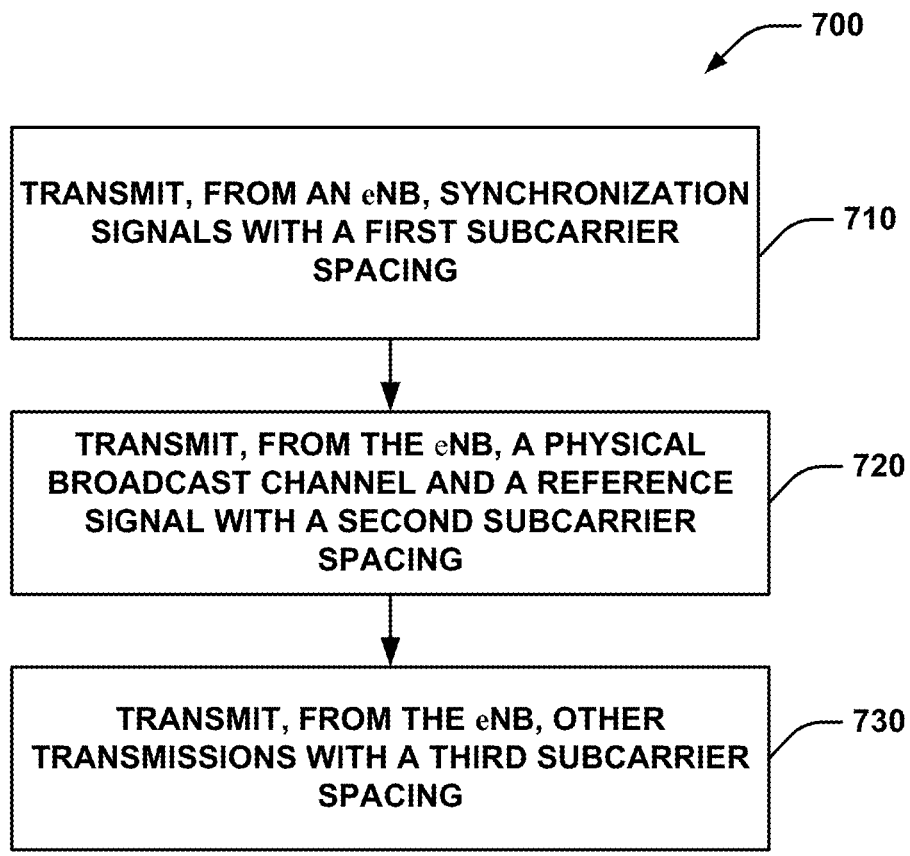
FIG. 7A is a flowchart of an example method for transmitting a subframe having synchronization signals using different subcarrier spacings in accordance with an embodiment.

FIG. 7A illustrates an example methodology 700 for transmitting one or more signals or transmissions from the eNB 120 in aspects of the present disclosure.

In an aspect, at block 710, methodology 700 may include transmitting, from an eNB, synchronization signals with a first subcarrier spacing, wherein the synchronization signals include a PSS and a SSS. For example, in an aspect, the eNB 120 and/or transmission function 126 may include a sync signal function 128, such as a specially programmed processor module, or a processor executing specially programmed code stored in a memory, to transmit, from the eNB 120, synchronization signals, e.g., PSS 181 and SSS 182 with a first subcarrier spacing.

In an aspect, at block 720, methodology 700 may include transmitting, from the eNB, a physical broadcast channel (PBCH) and a reference signal (RS) with a second subcarrier spacing. For example, in an aspect, eNB 120 and/or transmission function 126 may include a PBCH function 130 and RS function 132, such as a specially programmed processor module, or a processor executing specially programmed code stored in a memory, to transmit, from the eNB 120, PBCH 181 and RS 183 with a second subcarrier spacing. For example, the PBCH function 130 may transmit the PBCH and the RS function 132 may transmit the RS.

In an aspect, at block 730, methodology 700 may include transmitting, from the eNB, other transmissions with a third subcarrier spacing. For example, in an aspect, the eNB 120 and/or transmission function 126 may include a specially programmed processor module, or a processor executing specially programmed code stored in a memory, to transmit, from eNB 120, other transmissions with a third subcarrier spacing.

Figure 7B:
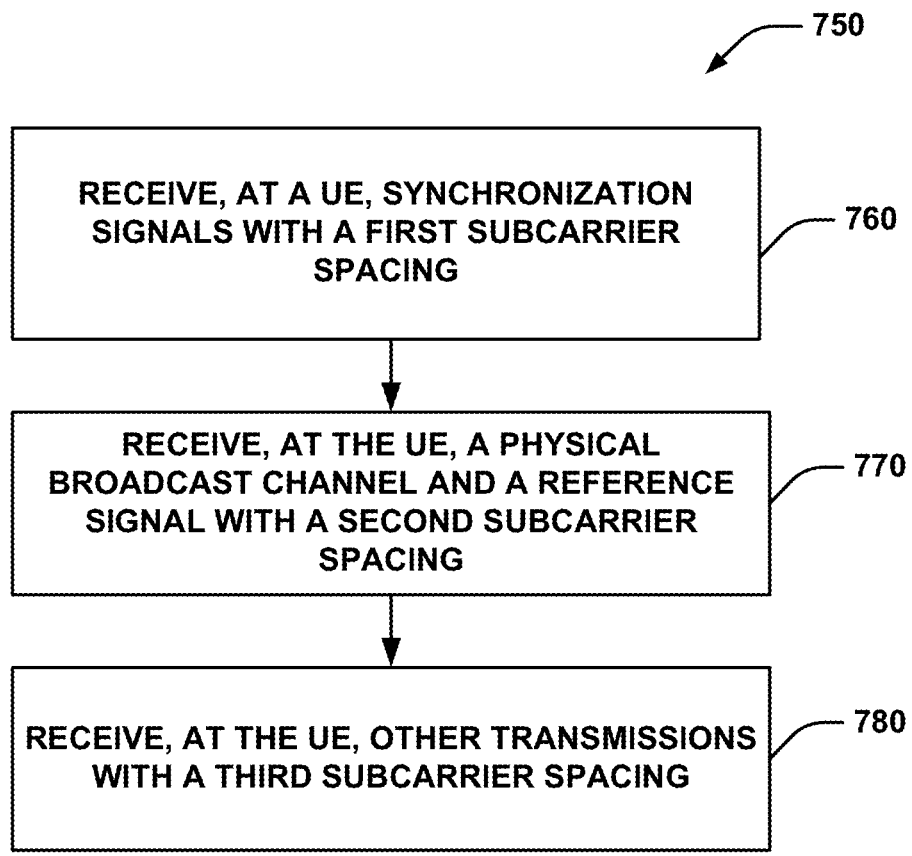
FIG. 7B is a flowchart of an example method for receiving a subframe having synchronization signals using different subcarrier spacings in accordance with an embodiment.

FIG. 7B illustrates an example methodology 750 for receiving one or more signals or transmissions at a UE 102 in aspects of the present disclosure.

In an aspect, at block 760, methodology 750 may include receiving at a UE, synchronization signals with a first subcarrier spacing, wherein the synchronization signals include a PSS and a SSS. For example, in an aspect, the UE 102 and/or receiving function 106 may include a specially programmed processor module, or a processor executing specially programmed code stored in a memory, to receive, at the UE 102, synchronization signals, e.g., PSS 181 and SSS 182 with a first subcarrier spacing.

In an aspect, at block 770, methodology 750 may include receiving, at the UE, a physical broadcast channel (PBCH) and a reference signal (RS) with a second subcarrier spacing. For example, in an aspect, the UE 102 and/or receiving function 106 may include a specially programmed processor module, or a processor executing specially programmed code stored in a memory, to receive, at the UE 102, PBCH 181 and RS 183 with a second subcarrier spacing. For example, the PBCH function 130 may transmit the PBCH and the RS function 132 may transmit the RS.

In an aspect, at block 780, methodology 750 may include receiving, at the UE, other transmissions with a third subcarrier spacing. For example, For example, in an aspect, the UE 102 and/or receiving function 106 may include a specially programmed processor module, or a processor executing specially programmed code stored in a memory, to receive, at the UE 102, other transmissions with a third subcarrier spacing.

Figure 8A:
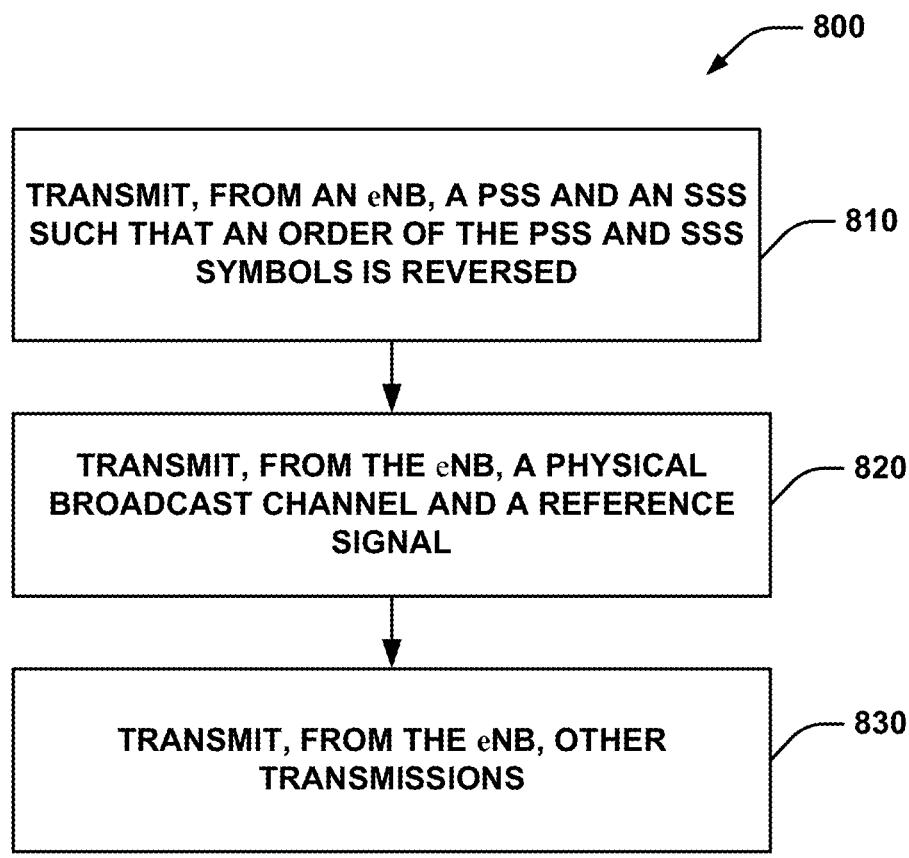
FIG. 8A is a flowchart of an example method for transmitting a subframe having synchronization signals using switched symbol positions in accordance with an embodiment.

FIG. 8A illustrates an example methodology 800 for transmitting one or more signals or transmissions from eNB 120 in aspects of the present disclosure.

In an aspect, at block 810, methodology 800 may include transmitting, from an eNB, synchronization signals, wherein the synchronization signals include a PSS and a SSS and the order of signals mapped to the PSS and SSS is reversed. For example, in an aspect, the eNB 120 and/or transmission function 126 may include a sync signal function 128, such as a specially programmed processor module, or a processor executing specially programmed code stored in a memory, to transmit, from the eNB 120, a symbol mapped to PSS 181 and a symbol mapped to SSS 182 with their order of appearance in the transmission frame reversed. The order of the symbols within a PSS/SSS sequence may provide information to a receiving UE 102 about the synchronization suggested by the eNB 120. In various aspects, the eNB 120 may know when to reverse the order of PSS and SSS symbols within the subframe based on the state of the eNB (e.g. eNB cell ID, the transmission mode for PBCH or knowing which PSS/SSS TTIs also contain PBCH).

In an aspect, at block 820, methodology 800 may include transmitting, from the eNB, a physical broadcast channel (PBCH) and a reference signal (RS). For example, in an aspect, eNB 120 and/or transmission function 126 may include a PBCH function 130 and RS function 132, such as a specially programmed processor module, or a processor executing specially programmed code stored in a memory, to transmit, from eNB 120, PBCH 182 and RS 183. For example, the PBCH function 130 may transmit the PBCH and the RS function 132 may transmit the RS.

In an aspect, at block 830, methodology 800 may include transmitting, from the eNB, other transmissions with a third subcarrier spacing. For example, in an aspect, eNB 120 and/or transmission function 126 may include a specially programmed processor module, or a processor executing specially programmed code stored in a memory, to transmit, from eNB 120, other transmissions.

Figure 8B:
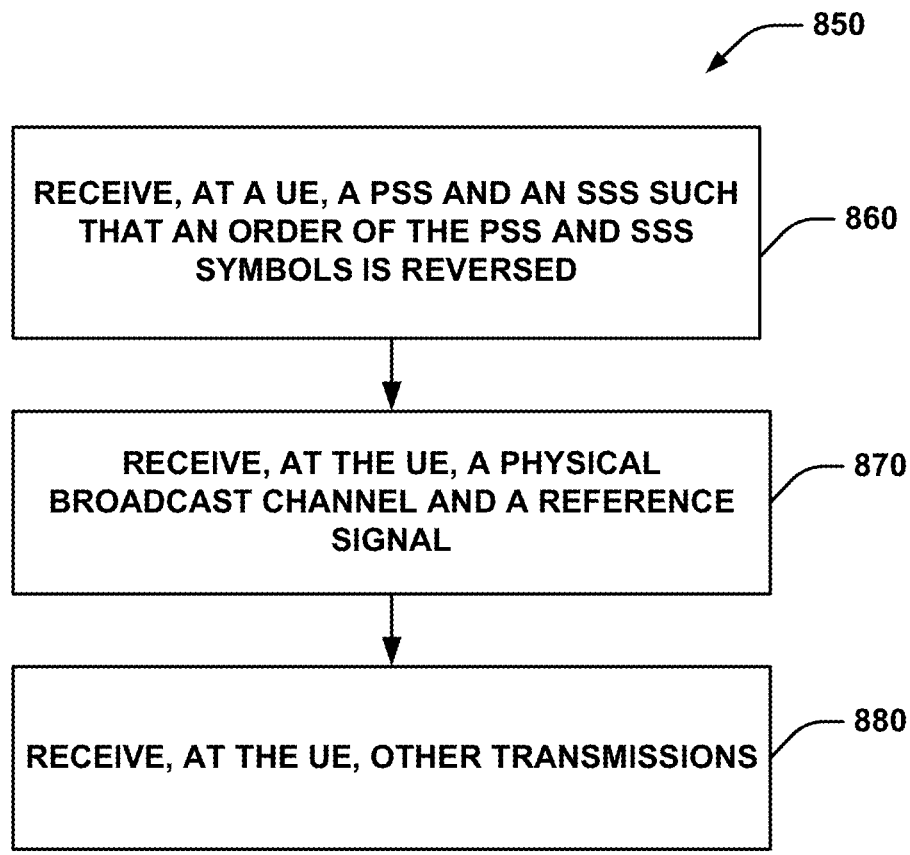
FIG. 8B is a flowchart of an example method for receiving a subframe having synchronization signals using switched symbol positions in accordance with an embodiment.

FIG. 8B illustrates an example methodology 850 for receiving one or more signals or transmissions at UE 102 in aspects of the present disclosure.

In an aspect, at block 860, methodology 850 may include receiving, at a UE, synchronization signals, wherein the synchronization signals include a PSS and a SSS and the order of signals mapped to the PSS and SSS is reversed. For example, in an aspect, the UE 102 and/or receiving function 106 may include a specially programmed processor module, or a processor executing specially programmed code stored in a memory, to receive, at the UE 102, a symbol mapped to PSS 181 and a symbol mapped to SSS 182 with their order of appearance in the transmission frame reversed. The order of the symbols within a PSS/SSS sequence may provide information to a receiving UE 102 about the synchronization suggested by the eNB 120. In various aspects, the eNB 120 may know when to reverse the order of PSS and SSS symbols within the subframe based on the state of the eNB (e.g. eNB cell ID, the transmission mode for PBCH or knowing which PSS/SSS TTIs also contain PBCH).

In an aspect, at block 870, methodology 850 may include receiving, at the UE, a physical broadcast channel (PBCH) and a reference signal (RS). For example, in an aspect, the UE 102 and/or receiving function 106 may include a specially programmed processor module, or a processor executing specially programmed code stored in a memory, to receive, at the UE 102, PBCH 182 and RS 183.

In an aspect, at block 880, methodology 850 may include receiving, at the UE, other transmissions with a third subcarrier spacing. For example, in an aspect, the UE 102 and/or receiving function 106 may include a specially programmed processor module, or a processor executing specially programmed code stored in a memory, to receive, at the UE 102, other transmissions.

Figure 9:
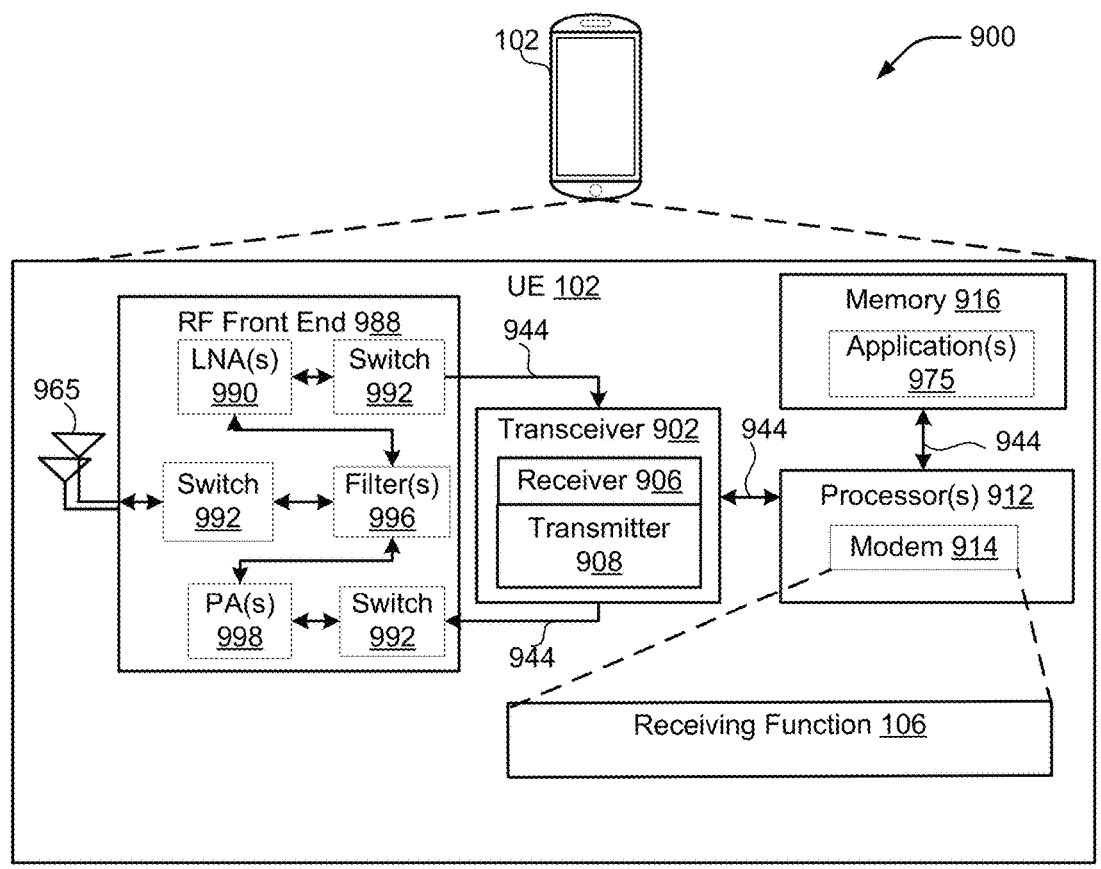
FIG. 9 is a schematic diagram of example components of the UE of FIG. 1B.

FIG. 9 schematically illustrates hardware components and subcomponents of the UE 102 for implementing one or more methods described herein in accordance with various aspects of the present disclosure. For example, one example of an implementation of the UE 102 may include a variety of components, some of which have already been described above, but including components such as one or more processors 912 and memory 916 and transceiver 902 in communication via one or more buses 944, which may operate to enable one or more of the functions described herein related to including one or more methods of the present disclosure. Further, the one or more processors 912, modem 914, memory 916, transceiver 902, RF front end 988 and one or more antennas 965, may be configured to support voice and/or data calls (simultaneously or non-simultaneously) in one or more radio access technologies.

In an aspect, the one or more processors 912 can include a modem 914 that uses one or more modem processors. The various functions related to receiving function 106 may be included in modem 914 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 922.

Also, memory 916 may be configured to store data used herein and/or local versions of applications being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 120. Additionally, receiver 906 may process such received signals, and also may obtain measurements of the signals, such as, but not limited to, Ec/Io, SNR, RSRP, RSSI, etc. Transmitter 928 may include hardware, firmware, and/or software code executable by a processor for transmitting data, the code comprising instructions and being stored in a memory (e.g., computer-readable medium). A suitable example of transmitter 1028 may including, but is not limited to, an RF transmitter.

Moreover, in an aspect, UE 102 may include RF front end 988, which may operate in communication with one or more antennas 965 and transceiver 902 for receiving and transmitting radio transmissions, for example, wireless communications transmitted by at least one base station 120 or wireless transmissions transmitted by UE 102. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 922 and/or processor 912.

As such, transceiver 902 may be configured to transmit and receive wireless signals through one or more antennas 965 via RF front end 988. In an aspect, transceiver may be tuned to operate at specified frequencies such that UE 102 can communicate with, for example, one or more base stations 120 or one or more cells associated with one or more base stations 120. In an aspect, for example, modem 914 can configure transceiver 922 to operate at a specified frequency and power level based on the UE configuration of the UE 102 and the communication protocol used by modem 914. Additionally, as described herein, the transceiver 922 may be configured to operate using a specified numerology during a time period and may change numerologies for use in different time periods. In various aspects the transceiver 922 may enable receiving of synchronization signals from a base station 120 via receiving function 106.

In an aspect, modem 914 can be a multiband-multimode modem, which can process digital data and communicate with transceiver 902 such that the digital data is sent and received using transceiver 902. In an aspect, modem 914 can be multiband and be configured to support multiple frequency bands for a specific communications protocol. In an aspect, modem 914 can be multimode and be configured to support multiple operating networks and communications protocols. In an aspect, modem 914 can control one or more components of UE 102 (e.g., RF front end 988, transceiver 902) to enable transmission and/or reception of signals from the network based on a specified modem configuration. In an aspect, the modem configuration can be based on the mode of the modem and the frequency band in use.

Figure 10:
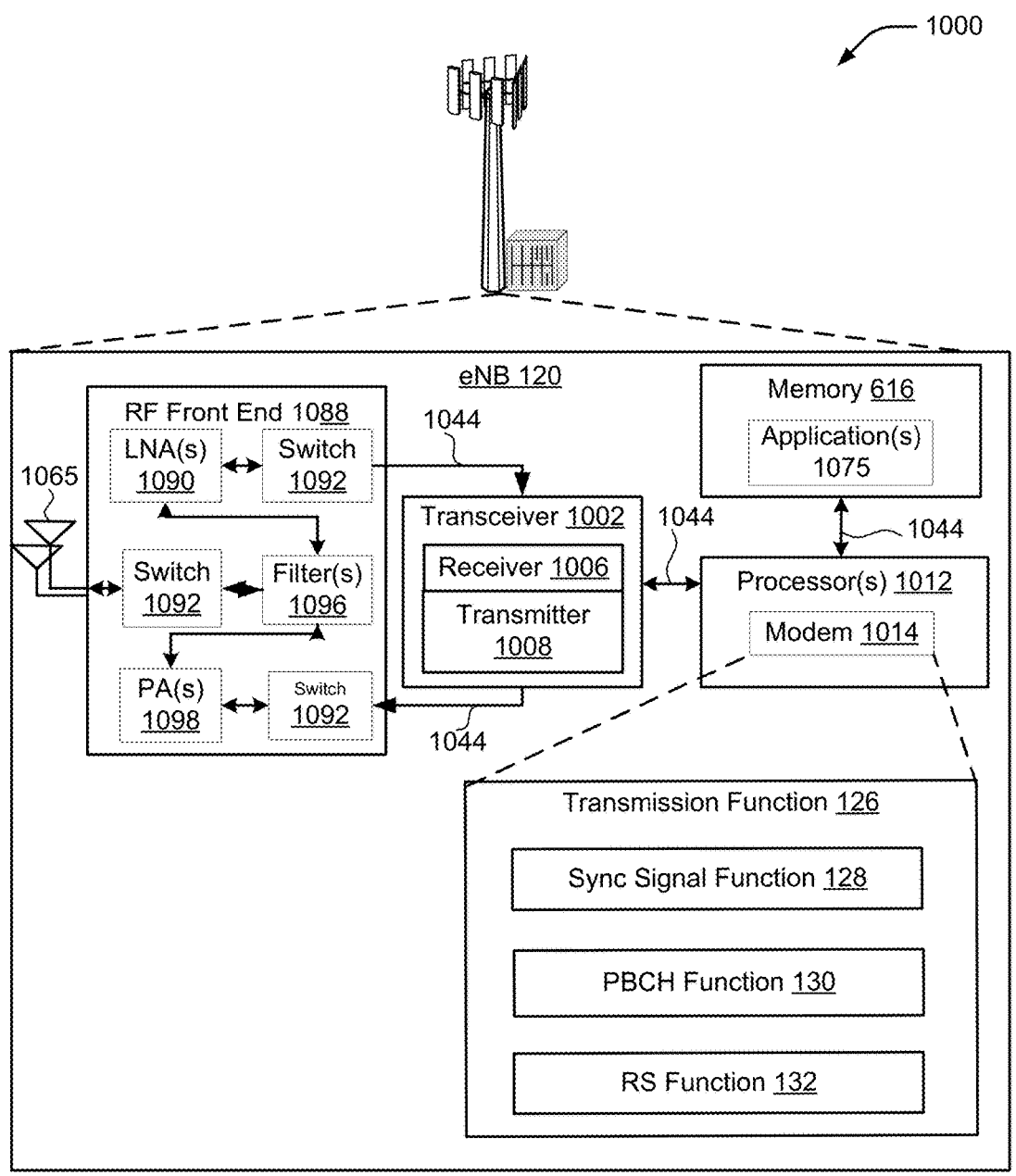
FIG. 10 is a schematic diagram of example components of the base station of FIG. 1B.

In FIG. 10 schematically illustrates hardware components and subcomponents of the base station 120 for implementing one or more methods (e.g., method s700, 800) described herein in accordance with various aspects of the present disclosure. For example, one example of an implementation of base station 120 may include a variety of components, some of which have already been described above, but including components such as one or more processors 1012 and memory 1016 and transceiver 1002 in communication via one or more buses 1044, which may enable one or more of the functions described herein related to transmission of synchronization signals, including one or more methods of the present disclosure. Further, the one or more processors 1012, modem 1014, memory 1016, transceiver 1002, RF front end 1088 and one or more antennas 1065, may be configured to support voice and/or data calls (simultaneously or non-simultaneously) in one or more radio access technologies.

In an aspect, the one or more processors 1012 can include a modem 1014 that uses one or more modem processors. The various functions related to transmission function 126 may be included in modem 1014 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with transmission function 126 may be performed by transceiver 1002.

Also, memory 1016 may be configured to store data used herein and/or local versions of applications 1075 or transmission function 26 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining transmission function 126 and/or one or more of its subcomponents, and/or data associated therewith, when base station 120 is operating at least one processor 1012 to execute transmission function 126 and/or one or more of its subcomponents.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 120. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, base station 120 may include RF front end 1088, which may operate in communication with one or more antennas 1065 and transceiver 1002 for receiving and transmitting radio transmissions, for example, wireless communications transmitted by base station 120 or wireless communications transmitted by UE 102. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and a specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and a specified gain value for the particular PA 1098 based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA As such, transceiver 1002 may be configured to transmit and receive wireless signals through one or more antennas 1065 via RF front end 1088. In an aspect, transceiver 1002 may be tuned to operate at specified frequencies such that base station 120 can communicate with, for example, one or more UEs 102. In another aspect, the transceiver 1002 may be tuned to operate at specified frequencies such that base station 120-*a* can detect reservations transmitted by neighboring base stations 120 or one or more cells associated with one or more base stations 120. In an aspect, for example, modem 1014 can configure transceiver 1002 to operate at a specified frequency and power level based on the base station configuration of the base station 120 and the communication protocol used by modem 1014. In various aspects transceiver 1022 may enable transmission of synchronization signals generated by various functions of modem 1014 such as transmission function 126 and/or the subcomponents of the transmission function 126. For example, transmission function 126 subcomponent sync signal function 128 may generate PSS and SSS signals, PBCH function 130 may generate PBCH signals and RS function 132 may generate RS signals, which may be transmitted using transceiver 1022.

In an aspect, modem 1014 can be a multiband-multimode modem, which can process digital data and communicate with transceiver 1002 such that the digital data is sent and received using transceiver 1002. In an aspect, modem 1014 can be multiband and be configured to support multiple frequency bands for a specific communications protocol. In an aspect, modem 1014 can be multimode and be configured to support multiple operating networks and communications protocols. In an aspect, modem 1014 can control one or more components of base station 120-*a* (e.g., RF front end 1088, transceiver 1002) to enable transmission and/or reception of signals from a UE based on a specified modem configuration. In an aspect, the modem configuration can be based on the mode of the modem and the frequency band in use.

Thus, as described above in reference to FIGS. 1-10, different subcarrier spacings along with transmission of sync signals in different TTIs may be used to improve performance in 5G/NR networks.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
transmitting, from a base station, synchronization signals with a first subcarrier spacing, wherein the synchronization signals include a primary synchronization signal (PSS) and a secondary synchronization signal (SSS);
transmitting, from the base station, a broadcast signal and a reference signal (RS) with a second subcarrier spacing; and
transmitting, from the base station, other transmissions with a third subcarrier spacing,
wherein the first subcarrier spacing, the second subcarrier spacing, and the third subcarrier spacing are defined at the base station, and
wherein the first subcarrier spacing is less than the third subcarrier spacing, or the second subcarrier spacing is less than the third subcarrier spacing, or both the first subcarrier spacing and the second subcarrier spacing are less than the third subcarrier spacing.

2. The method of claim 1, wherein the first subcarrier spacing is different from the second carrier spacing, and both the first subcarrier spacing and the second carrier spacing are less than the third subcarrier spacing.

3. The method of claim 1, wherein broadcast signal has at least two symbols having identical modulation symbols, RS sequences and RS tone mapping.

4. The method of claim 1, wherein the broadcast signal and the RS are frequency division multiplexed (FDM).

5. The method of claim 1, wherein the PSS and SSS have a first transmission time interval (TTI) and the broadcast signal and RS have a second TTI, with the first TTI and the second TTI being different.

6. The method of claim 1, wherein multiple PSS sequences are mapped to multiple PSS symbols and multiple SSS sequences are mapped to multiple SSS symbols.

7. The method of claim 1, wherein the first subcarrier spacing is 15 KHz and the second subcarrier spacing is 30 KHz.

8. The method of claim 1, wherein the SSS is transmitted in a symbol that is located before a symbol of the PSS.

9. The method of claim 1, wherein transmitting the PSS and the SSS with a first subcarrier spacing comprises transmitting multiple identical PSS symbols.

10. The method of claim 1, wherein transmitting the PSS and the SSS with a first subcarrier spacing comprises transmitting multiple identical SSS symbols.

11. The method of claim 1, wherein transmitting the PSS and the SSS comprises transmitting multiple symbols of at least one of PSS symbols or SSS symbol.

12. The method of claim 1, wherein the base station is an eNB or a gNB.

13. The method of claim 1, wherein the broadcast signal comprises a physical broadcast channel (PBCH).

14. A base station for wireless communications, comprising:
a transceiver;
a memory; and
a processor communicatively coupled with the transceiver and the memory, the processor and the memory configured to:
transmit synchronization signals with a first subcarrier spacing, wherein the synchronization signals include a primary synchronization signal (PSS) and a secondary synchronization signal (SSS);

transmit a broadcast signal and a reference signal (RS) with a second subcarrier spacing; and transmit other transmissions with a third subcarrier spacing, wherein the first subcarrier spacing, the second subcarrier spacing, and the third subcarrier spacing are defined at the base station, and wherein the first subcarrier spacing is less than the third subcarrier spacing, or the second subcarrier spacing is less than the third subcarrier spacing, or both the first subcarrier spacing and the second subcarrier spacing are less than the third subcarrier spacing.

15. The base station of claim 14, wherein the first subcarrier spacing is different from the second carrier spacing, and both the first subcarrier spacing and the second carrier spacing are less than the third subcarrier spacing.

16. The base station of claim 14, wherein the broadcast signal has at least two symbols having identical modulation symbols, RS sequences and RS tone mapping.

17. The base station of claim 14, wherein the broadcast signal and the RS are frequency division multiplexed (FDM).

18. The base station of claim 14, wherein the PSS and SSS have a first transmission time interval (TTI) and the broadcast signal and RS have a second TTI, with the first TTI and the second TTI being different.

19. The base station of claim 14, wherein multiple PSS sequences are mapped to multiple PSS symbols and multiple SSS sequences are mapped to multiple SSS symbols.

20. The base station of claim 14, wherein the first subcarrier spacing is 15 KHz and the second subcarrier spacing is 30 KHz.

21. The base station of claim 14, wherein the SSS is transmitted in a symbol that is located before a symbol of the PSS.

22. The base station of claim 14, wherein transmitting the PSS and the SSS with a first subcarrier spacing comprises transmitting multiple identical PSS symbols.

23. The base station of claim 14, wherein transmitting the PSS and the SSS with a first subcarrier spacing comprises transmitting multiple identical SSS symbols.

24. The base station of claim 14, wherein transmitting the PSS and the SSS comprises transmitting multiple symbols of at least one of PSS symbols or SSS symbol.

25. The base station of claim 14, wherein the base station is an eNB or a gNB.

26. The base station of claim 14, wherein the broadcast signal comprises a physical broadcast channel (PBCH).

27. A base station comprising
means for transmitting synchronization signals with a first subcarrier spacing, wherein the synchronization signals include a primary synchronization signal (PSS) and a secondary synchronization signal (SSS);
means for transmitting a broadcast signal and a reference signal (RS) with a second subcarrier spacing; and
means for transmitting other transmissions with a third subcarrier spacing,
wherein the first subcarrier spacing, the second subcarrier spacing, and the third subcarrier spacing are defined at the base station, and wherein the first subcarrier spacing is less than the third subcarrier spacing, or the second subcarrier spacing is less than the third subcarrier spacing, or both the first subcarrier spacing and the second subcarrier spacing are less than the third subcarrier spacing.

28. The base station of claim 27, wherein the first subcarrier spacing is different from the second carrier spacing, and both the first subcarrier spacing and the second carrier spacing are less than the third subcarrier spacing.

29. The base station of claim 27, wherein the broadcast signal has at least two symbols having identical modulation symbols, RS sequences and RS tone mapping.

30. The base station of claim 23, wherein multiple PSS sequences are mapped to multiple PSS symbols and multiple SSS sequences are mapped to multiple SSS symbols.

31. The base station of claim 27, wherein the SSS is transmitted in a symbol that is located before a symbol of the PSS.

32. The base station of claim 27, wherein means for transmitting the PSS and the SSS comprises means for transmitting multiple symbols of at least one of PSS symbols or SSS symbol.

33. The base station of claim 27, wherein the base station is an eNB or a gNB.

34. The base station of claim 27, wherein the broadcast signal comprises a physical broadcast channel (PBCH).

35. A non-transitory computer-readable medium having processor-executable instructions stored thereon to cause a processor to operations, comprising:
transmitting, from a base station, synchronization signals with a first subcarrier spacing, wherein the synchronization signals include a primary synchronization signal (PSS) and a secondary synchronization signal (SSS);
transmitting, from the base station, a broadcast signal and a reference signal (RS) with a second subcarrier spacing; and
transmitting, from the base station, other transmissions with a third subcarrier spacing,
wherein the first subcarrier spacing, the second subcarrier spacing, and the third subcarrier spacing are defined at the base station, and
wherein the first subcarrier spacing is less than the third subcarrier spacing, or the second subcarrier spacing is less than the third subcarrier spacing, or both the first subcarrier spacing and the second subcarrier spacing are less than the third subcarrier spacing.

36. The non-transitory computer-readable medium of claim 35, wherein the first subcarrier spacing is different from the second carrier spacing, and both the first subcarrier spacing and the second carrier spacing are less than the third subcarrier spacing.

37. The non-transitory computer-readable medium of claim 35, wherein the base station is an eNB or a gNB.

38. The non-transitory computer-readable medium of claim 35, wherein the broadcast signal comprises a physical broadcast channel (PBCH).

* * * * *